US006351654B1

United States Patent
Huang et al.

(10) Patent No.: US 6,351,654 B1
(45) Date of Patent: Feb. 26, 2002

(54) ANTENNA CONFIGURATION FOR A HYBRID INNER/OUTER SECTORED CELL

(75) Inventors: Joe Huang, Bloomfield; Colin Leon Kahn, Cedar Knolls; Philip Lamoureux, Succasunna; Myles Patrick Murphy, Annandale; Bulin Zhang, Branchburg, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/167,186

(22) Filed: Oct. 6, 1998

Related U.S. Application Data

(60) Provisional application No. 60/063,027, filed on Oct. 23, 1997.

(51) Int. Cl.[7] .............................................. H04B 1/38
(52) U.S. Cl. ...................... 455/562; 455/422; 455/561; 455/447
(58) Field of Search ................................ 455/422, 561, 455/562, 447

(56) References Cited

U.S. PATENT DOCUMENTS

| | | | | |
|---|---|---|---|---|
| 5,432,780 A | * | 7/1995 | Smith et al. ................ 370/297 |
| 5,535,423 A | * | 7/1996 | Dupuy ........................ 455/449 |
| 5,537,682 A | * | 7/1996 | Miller ......................... 455/447 |
| 5,603,089 A | * | 2/1997 | Searle et al. ................ 455/507 |
| 5,615,215 A | * | 3/1997 | Utting et al. ................ 370/337 |
| 5,714,957 A | * | 2/1998 | Searle et al. ................ 342/374 |
| 5,742,911 A | * | 4/1998 | Dumbrill et al. ........... 455/562 |
| 5,771,017 A | * | 6/1998 | Dean et al. ................. 342/374 |
| 5,825,764 A | * | 10/1998 | Rudolph ..................... 370/337 |
| 5,844,894 A | * | 12/1998 | Dent ........................... 455/447 |
| 5,861,844 A | * | 1/1999 | Gilmore et al. ............. 342/374 |
| 5,889,494 A | * | 3/1999 | Reudink et al. ............ 455/443 |
| 5,901,355 A | * | 5/1999 | Doner ......................... 455/447 |
| 5,933,766 A | * | 8/1999 | Dent ........................... 455/103 |
| 5,937,333 A | * | 8/1999 | Sexton et al. ................ 455/73 |
| 6,061,568 A | * | 5/2000 | Dent ........................... 455/450 |
| 6,151,310 A | * | 11/2000 | Dent ........................... 455/561 |

FOREIGN PATENT DOCUMENTS

EP     0 604 403 A1     6/1994     ............ H04Q/7/04

* cited by examiner

*Primary Examiner*—Curtis Kuntz
*Assistant Examiner*—Barry W Taylor
(74) *Attorney, Agent, or Firm*—Irena Lager

(57) ABSTRACT

Sharing the existing sector antennas at the base station each of which corresponds to one sector of the outer communication coverage area to create an omnidirectional inner communication coverage area. When transmitting or receiving data from a mobile in one sector of the outer communication coverage area only one antenna is used, and when transmitting or receiving data from a mobile in the inner communication coverage area all the antennas are used. This allows an increase in capacity of the hybrid inner/outer sectored cell without the additional cost of adding further antennas.

9 Claims, 6 Drawing Sheets

FIG. 3A

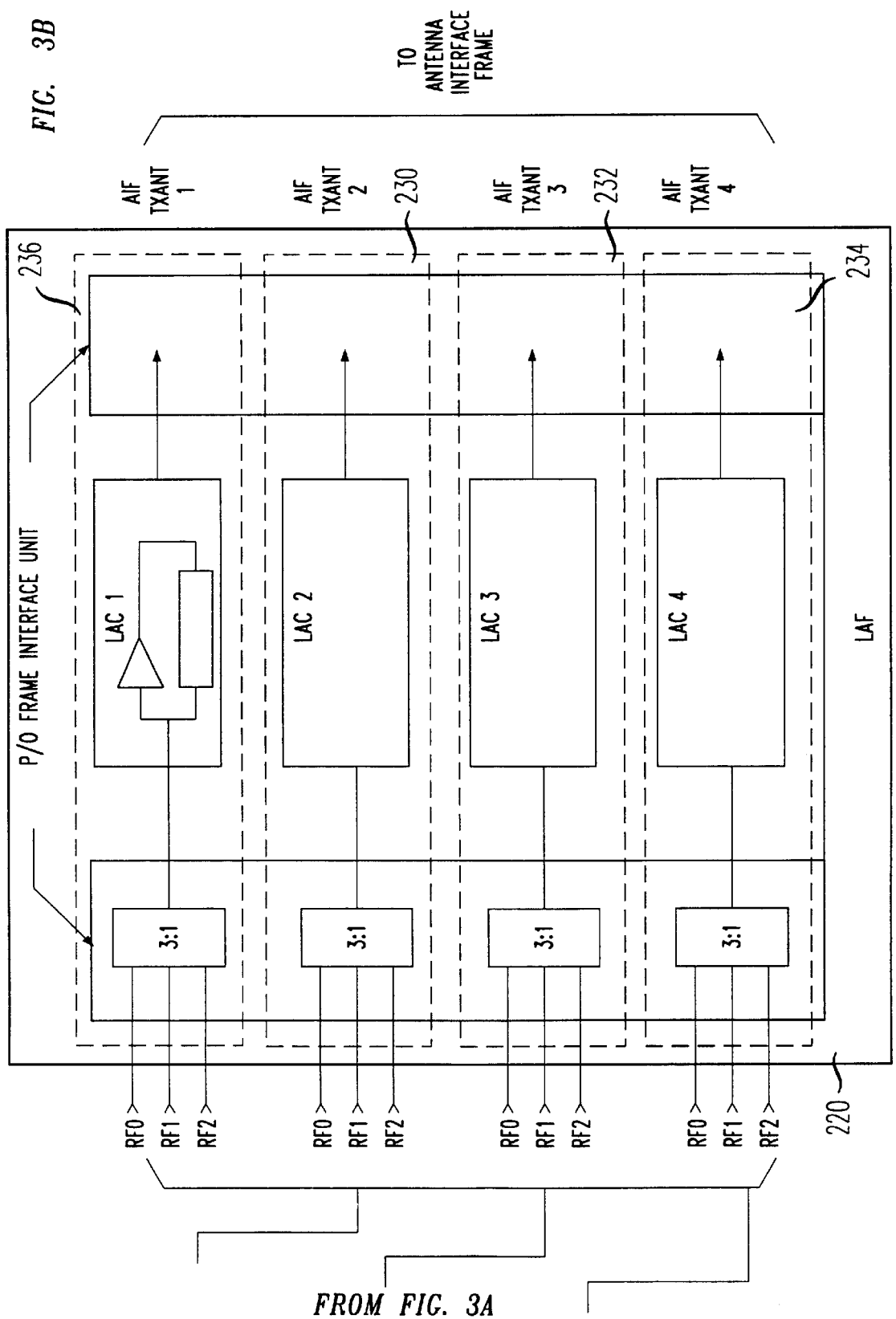

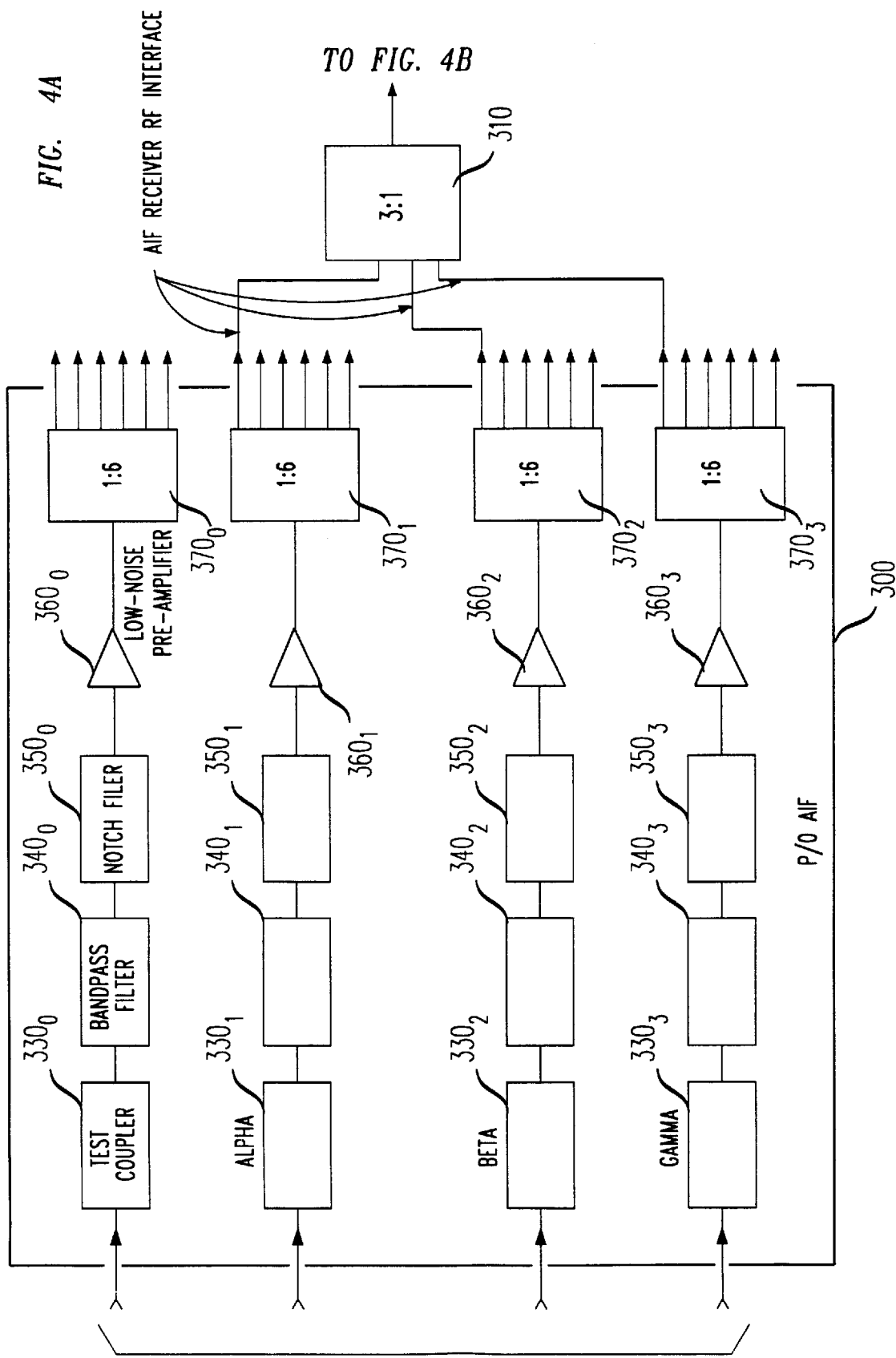

FROM FIG. 4A

FIG. 5

| CONTROLLER | | | | | | | | | | | | | | | | |
|---|---|---|---|---|---|---|---|---|---|---|---|---|---|---|---|---|
| COMB | ALPHA | | | GAMMA | | | BETA | | | CAT | 5V | SW | SW | | | |
| | EDRU | ANSU | | EDRU | ANSU | ANLO | EDRU | ANSU | | | | | | | | |
| COMB | BETA | | | | ALPHA | | | | GAMMA | | | CAT | 5S | DIV | DIV | |
| | ANA | ANA | EDRU | EDRU | ANA | ANA | EDRU | EDRU | ANA | ANA | EDRU | EDRU | | | | |
| FAN UNITS | | | | | | | | | | | | | | | | |
| COMB | | | | | | TEST | | | | | | DS1 | 5V | DIV | DIV | |
| COMB | OMNI SIMUL | | | | OMNI SIMUL | | | | OMNI SIMUL | | | | DS1 | 5V | DIV | DIV |
| | EDRU | EDRU | EDRU | EDRU | EDRU | EDRU | EDRU | EDRU | EDRU | EDRU | EDRU | EDRU | | | | |
| COMB | OMNI SIMUL | | | | OMNI SIMUL | | | | OMNI SIMUL | | | | | 5V | DIV | DIV |
| | EDRU | EDRU | EDRU | EDRU | EDRU | EDRU | EDRU | EDRU | | | | | | | | |

& # x 20; # ANTENNA CONFIGURATION FOR A HYBRID INNER/OUTER SECTORED CELL

CROSS-REFERENCE TO RELATED APPLICATIONS

This application claims priority of Provisional Application Ser. No. 60/063,027 which was filed Oct. 23, 1997.

FIELD OF THE INVENTION

This invention is related to hybrid inner/outer sectored cells in wireless communication systems, and more particularly to antenna configurations in such systems.

BACKGROUND OF THE INVENTION

Dual server group configuration cells, hereinafter hybrid inner/outer sectored cells, can be used in a wireless communication system to maximize the capacity of the available of spectrum, and to help to reduce the total number of cells required. FIG. 1 shows hybrid inner/outer sectored cell 10. Hybrid inner/outer sectored cell 10 has an inner server group, hereinafter inner communication coverage area 12, and an outer server group, hereinafter outer communication coverage area 14. The available spectrum is divided into 30 kHz carriers. The carriers assigned to hybrid inner/outer sectored cell 10 are divided into an inner group that are used in inner communication coverage area 12 and an outer group that is used in outer communication coverage area 14. In the configuration shown in FIG. 1, outer communication coverage area 14 is further sectored into three sectors 16, 18, 20 each covered by one of three sector antennas at the base station of hybrid inner/outer sectored cell 10. The inner communication coverage area is not sectored, or as known in the industry it is an omni sector, covered by an omnidirectional antenna. An omni inner communication coverage area is desirable over a three sector inner communication coverage area since more capacity is realized when there is one trunk group of channels, instead of dividing the channels of one trunk group among the three trunk groups of three sectors. The trunk group of channels is a group of channels available for assignment to a user on a particular antenna face.

Normally hybrid inner/outer sectored cell 10 having three sectored outer communication coverage area 14 and omni inner communication coverage area 12 can be implemented by adding a dedicated omnidirectional antenna to inner communication coverage area 12. A problem with such a system is that it requires an additional antenna. The additional antenna adds additional installation, maintenance, and lease costs and additional space to the base station. The additional antenna also often detracts form the aesthetics of the surrounding area.

The hybrid inner/outer sectored cell can also be implemented using the same antennas for the inner and outer communication coverage areas, however this requires that the inner and outer communication coverage areas are either both sectored into the same number of sectors, or that they are both omni cell. Unfortunately, this would not allow for a hybrid inner/outer sectored cell as shown in FIG. 1.

SUMMARY OF THE INVENTION

The invention solves the above problems by sharing the existing sector antennas at the base station used for the sectors of the outer communication coverage area to create an omnidirectional inner communication coverage area without increasing the total number of antennas. This allows an increase in capacity of the hybrid inner/outer sectored cell without the additional cost and additional space requirements of adding further antennas.

A base station for the hybrid inner/outer sectored cell has one antenna corresponding to each of the sectors in the outer communication coverage area. The base station also has a combiner and a divider. The combiner is in the receive path of the base station. The signal received on at least two of the antennas is combined in the combiner to obtain the uplink signal. The divider is in the transmit path of the base station. The divider provides signal generated by the radios of the base station to at least two of the antennas.

BRIEF DESCRIPTION OF THE DRAWINGS

It should be noted that the Figures are drawn to best illustrate preferred embodiments of the invention and are not drawn to scale.

FIGS. 3a and 3b is a block diagram of a portion of a transmit path of a base station for a hybrid inner/outer sectored cell having a sectored outer communication coverage area and omni inner communication coverage area;

FIGS. 4a and 4b is a block diagram of a portion of a receive path of a base station for a hybrid inner/outer sectored cell having a sectored outer communication coverage area and omni inner communication coverage area;

FIG. 5 is a block diagram of a cabinet for the base stations of FIGS. 3 and 4.

DETAILED DESCRIPTION

Figure 1:
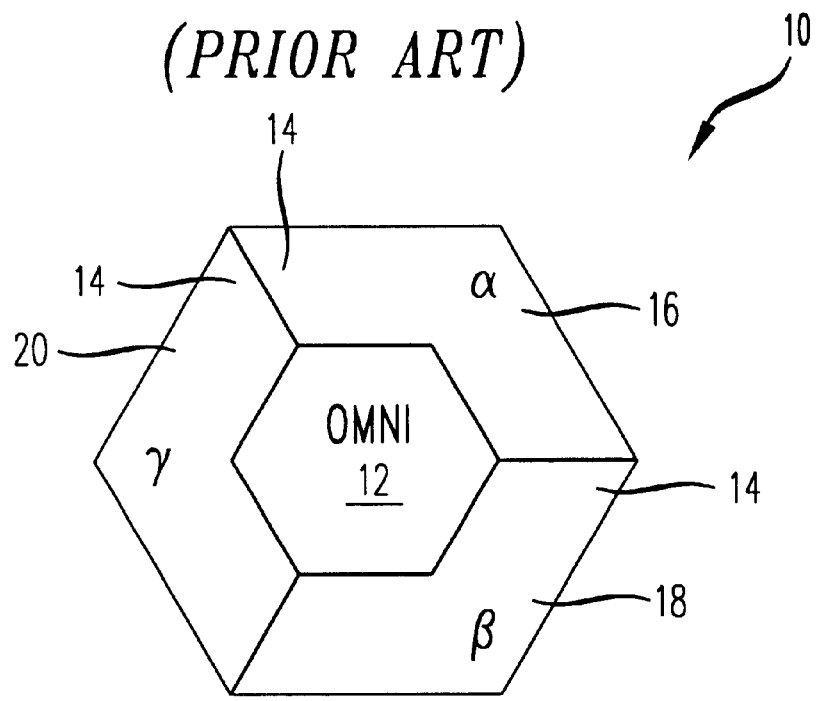
FIG. 1 is a schematic representation of a conventional hybrid inner/outer sectored cell.
Figure 2:
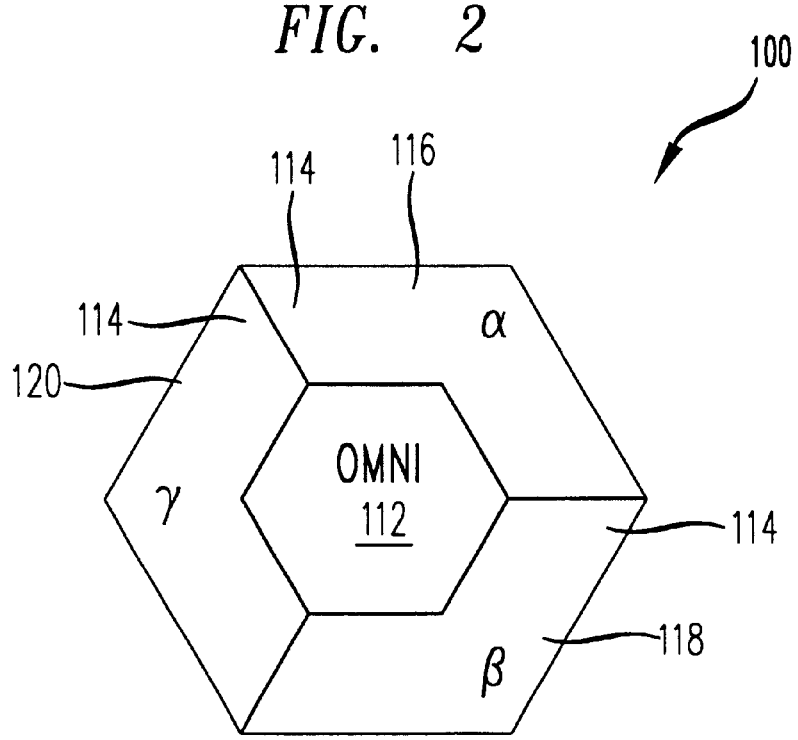
FIG. 2 is a block diagram of a hybrid inner/outer sectored cell.

FIG. 2 illustrates hybrid inner/outer sectored cell 100. Hybrid inner/outer sectored cell 100 has an inner server group, hereinafter inner communication coverage area 112, and an outer server group, hereinafter outer communication coverage area 114. The available spectrum is divided into 30 kHz carriers. The carriers assigned to cell 100 are divided into an inner group that are used in inner communication coverage area 112 and an outer group that is used in outer communication coverage area 114. Outer communication coverage area 114 is further sectored into three sectors 116, 118, 120 each covered by one of three sector antennas at the base station of cell 100. Preferably, Mobile Assisted Handoff (MAHO) is used without digital locate for handoffs among the sectors of the hybrid inner/outer sectored cell and for handoffs among hybrid inner/outer sectored cells 100. Inner communication coverage area 112 is an omni sector configuration. The base station of hybrid inner/outer sectored cell 100 shares the existing three sector antennas that the base station is using for outer communication coverage area 114 to create an omnidirectional inner communication coverage area without increasing the total number of antennas.

The signals for the inner communication coverage area will be simulcast over the outer communication coverage area's three antennas, yet appear omnidirectional. Simulcasting the signal means that it is transmitted concurrently over the three transmit antennas and received concurrently over the three receive antennas. As known in the art, separate transmit and receive antennas are often used at the base station to transmit and receive signals over the air interface, although a common single antenna and a means of separating the transmitted signal from the received signal can also be used. If a common antenna is used for both transmitting and receiving the signal, there is one such antenna for each of the sectors in the outer communication coverage area, and the signals directed to the mobiles in the inner communication coverage area are simulcast over all of these antennas.

Figure 3A:
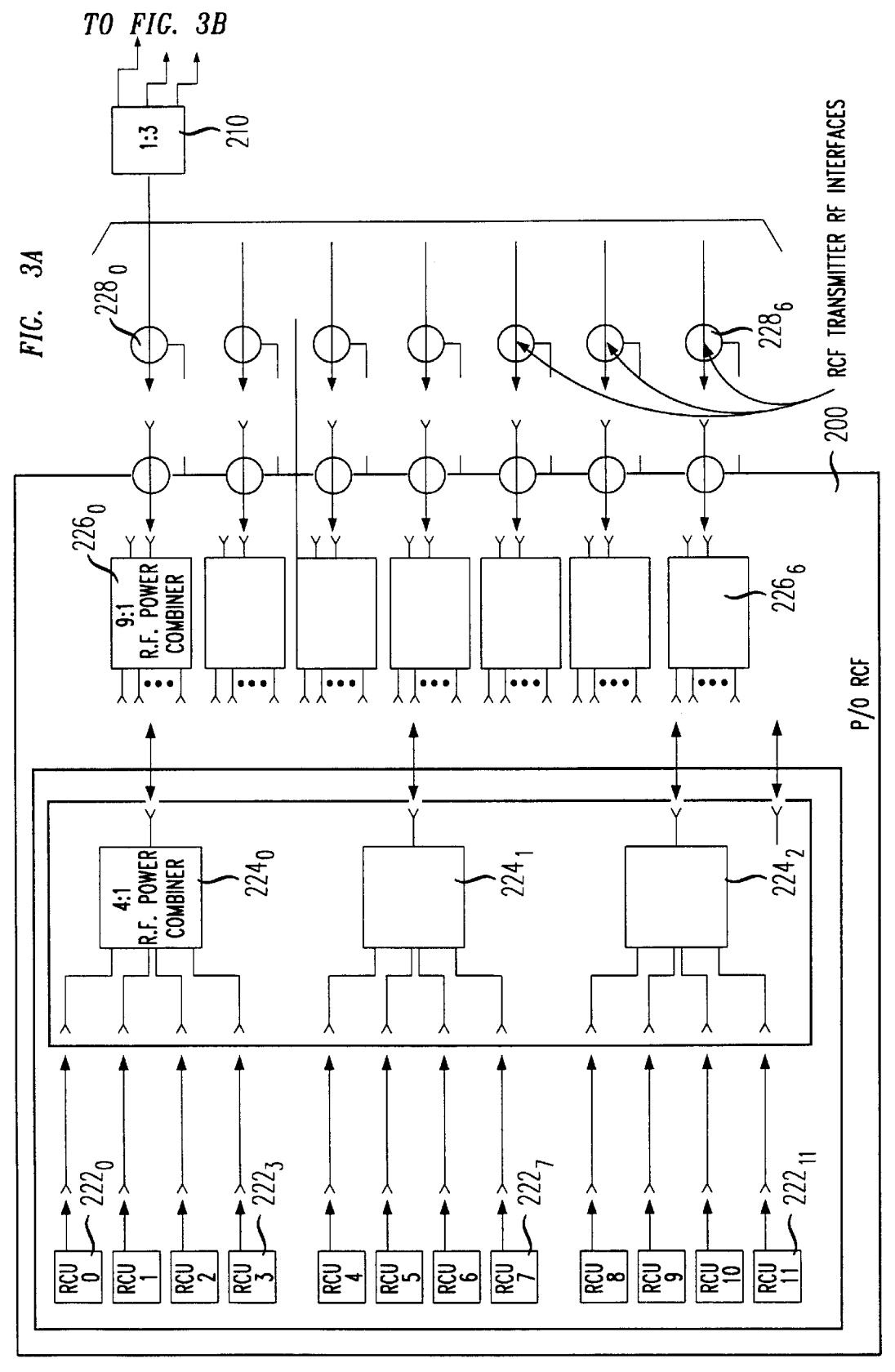

For the downlink, the transmission of signals from the base station to the mobile unit, the signal is transmitted on all three of the sector antennas. The transmit path is shown in FIGS. 3a and 3b. The transmit path contains Radio Control Frame (RCF) 200 connected to 1:3 divider 210. The output of 1:3 divider 210 is connected to Linear Amplifier Frame (LAF) 220, which is connected to the antennas (not shown). The transmission signals are generated by the radios $222_0 \ldots 222_{11}$ of the RCF 200. The transmission signals are combined in 4:1 combiners $224_0 \ldots 224_2$ and then in the 9:1 combiners $226_0 \ldots 226_6$. The output of 9:1 combiners $226_0 \ldots 226_6$ is coupled to 1:3 divider 210 through RCF Transmitter RF Interfaces $228_0 \ldots 228_6$. 1:3 divider 210 divides the output of one of 9:1 power combiners $226_0 \ldots 226_6$ and provides the signal to LAF 220. The LAF has one section 230, 232, 234 for each of the three sector antennas. The LAF may also have a section 236 for an omni antenna, which should have been required in the prior art but is not used in the present invention. If section 236 is in the LAF it is not used, and as can be seen in FIGS. 3a and 3b, it is not connected to the 1:3 divider. Each of the three outputs of 1:3 divider 210 is fed to its respective sector 230, 232, 234 in LAF 220 for amplification. It is recommended that the 1:3 divider be mounted on a panel in the LAF. The signal from the outputs of 1:3 divider 210 are fed to the RF2 inputs of LAF (or to any of available input of the LAF) and then routed to the Antenna Interface Frame (AIF) for filtering and transmission by sector antennas. Although, extra loss is introduced in the transmit path by 1:3 divider 210, since the signal is for the smaller inner communication coverage area 112, the loss can be accounted for by calibrating the software or by hardware adjustments.

Figure 4B:
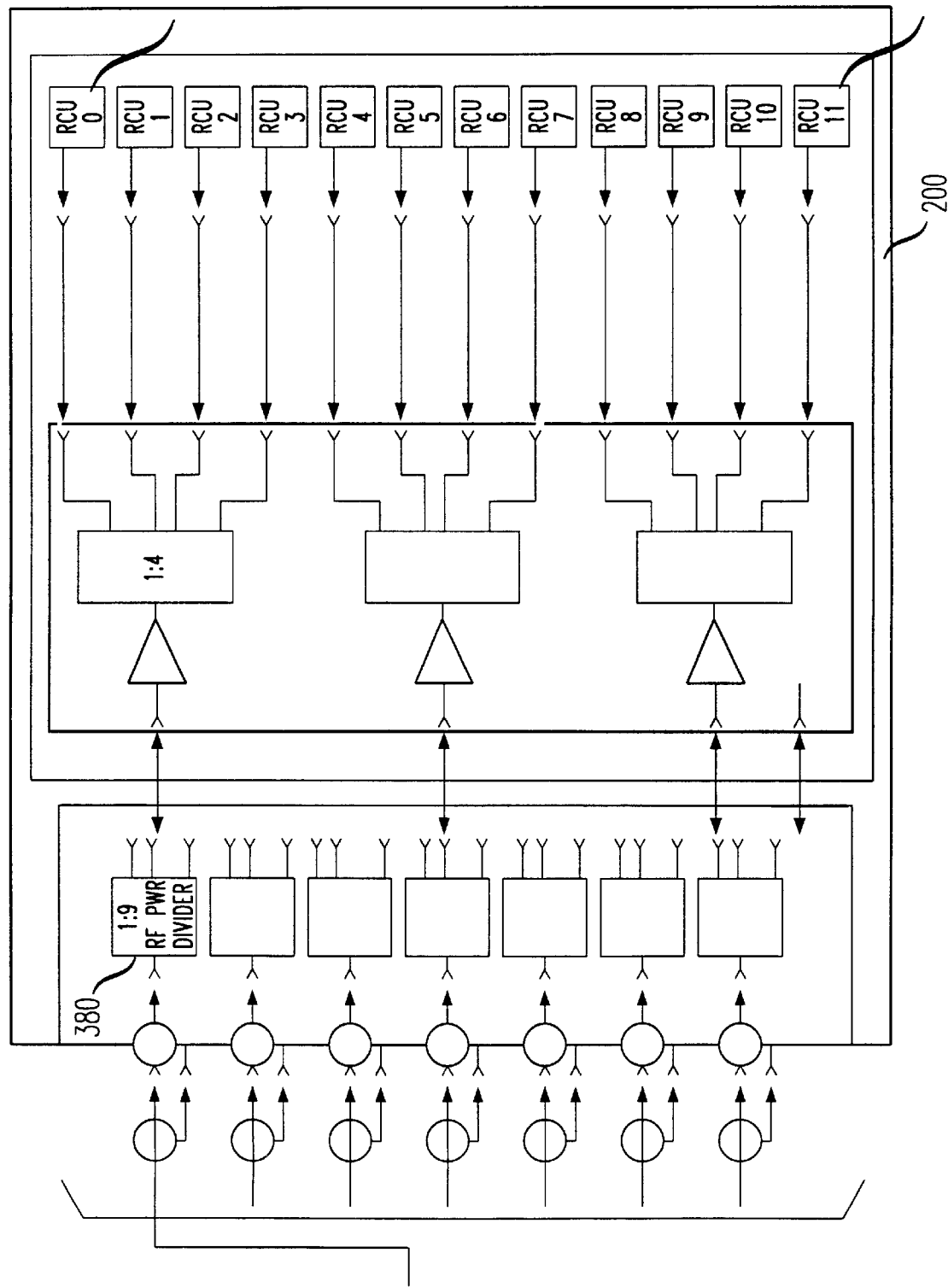

The uplink signal, the signal transmitted from the mobile unit to the base station, is constructed using the signals received on the three sector antennas. The receive path is shown in FIGS. 4a and 4b. The receive path contains antennas, AIF 300, 3:1 combiner 310, and RCF 200. It is recommended that a new panel be added into the AIF which contains 3:1 combiner 310. The signals are received on the antennas and sent to AIF 300, which contain an AIF receiver path for each of the antennas. Each AIF receiver path contains test coupler $330_1 \ldots 330_3$ used to monitor test signals, filters $340_1 \ldots 340_3, 350_1 \ldots 350_3$ to filter the signal, preamplifier $360_1 \ldots 360_3$ and power divider $370_1 \ldots 370_3$ which produces the needed number of the signal outputs, each having the signal typically at a reduced power. Similar to the LAF, the AIF may also have a receiver path for an omni antenna, which should have been required in the prior art but is not used in the present invention. If this receiver path is in the AIF it is not used, and as can be seen in FIGS. 4a and 4b, it is not connected to the 3:1 combiner. One signal output from power divider $370_1 \ldots 370_3$ in each of the sectors is coupled to 3:1 combiner 310, which combines the signals and feeds them to 1:9 power divider 380 in RCF 200. If path loss is a problem (higher noise figure), a 1:6 power divider could be substituted instead of the 1:9 power divider. Each output of the 1:9 divider feeds one of the six 1:4 power dividers, which feed 4 radios. The radios can be any suitable radios, such as Lucent Technologies' Enhanced Digital Radio Unit (EDRU).

The base station can be any suitable base station. Preferably, Lucent Technologies' Series II Classic is the selected platform for this technique. It can easily support 56 EDRUs (with vocoder relocation) in the primary frame and provides a composite output power at J4 of 110 Watts. The flexibility of the Series II Classic architecture allows this configuration to be supported with minor modifications to the existing frame hardware. The changes to the frame hardware are such that it can be done by using a total of three transmit antennas for both the inner and outer communication coverage areas.

To support the hybrid inner/outer sectored cell configuration, minor hardware modifications must be made to the Series II Classic in both the receive path and transmit paths so the paths comply with the above description. It is recommended that the two bottom shelves in the Series II Primary frame be dedicated to the inner communication coverage area. These two shelves can support up to a total of 24 radios. FIG. 5 indicates how the primary frame would be partitioned for the configurations of inner group and outer group channels of Table 2, supra. For illustrative purposes only, the primary frame contains radios to support analog.

If desired, regular three sector Series II Classic cells can be deployed to the field early in the program and the hardware and software changes required to support the hybrid inner/outer sectored cell feature can be later accomplished at later phases of the program in the field. These changes can be made in the field once systems are deployed.

Other Lucent Technologies' cellular products like the Series IIm, Series IImm, or Plan R Microcell base stations can also be used, however they either require more significant changes to the transmit path, don't have enough transmit power, or don't have the total radio count to as easily support this type of hybrid inner/outer sectored cell technique.

This modified hybrid inner/outer sectored cell feature has minimal impact on the existing call processing for this feature. To support call processing, it is required that 4 Digital Control Channels (DCCH) be assigned to the configuration. 3 DCCHs (1 per sector) would be required for the outer communication coverage area and 1 DCCH for the onmidirectional inner communication coverage area. Also, the call processing software will need to be told through translations what channel sets are assigned to the various sectors so handoffs can be properly orchestrated.

Operation, administration and maintenance (OA&M) will be impacted by the modified hybrid inner/outer sectored cell. Alarms for the Linear Amplifier Circuits (LACs) which support the omnidirectional inner communication coverage area will need to be reworked. One to one correspondence of the EDRU to the LAC causes issues with the hardware error handling (HEH). Call processing is inhibited for all radios associated with a LAC that is in critical alarm. In this configuration, we want to block only those radios servicing the outer communication coverage area. Radios servicing the inner communication coverage area would be blocked when all three LACs are in critical alarm. In terms of radio diagnostics and antenna functional test, the inner communication coverage area radios need to be tested on all three antenna faces.

It would also be recommended that a new configuration be added to the Recent Change and Verify (RCV) screen to support this feature.

Software changes to support this configuration should be minor, but an entire generic, i.e. software that runs the cell, must be downloaded.

Hybrid inner/outer sectored cell 100 maximizes the capacity of the available spectrum in the cellular band allotted, and helps to reduce the total number of cells required. The hybrid inner/outer sectored cell approach is presented for wireless systems such as TDMA cellular/PCS systems. The outer communication coverage area uses three sector configuration while the inner communication coverage area can be either omni or three sector configuration. The approach takes advantages of the fact that the inner communication coverage area radiates less power, hence causing less interference to other cells as compared to the outer communication coverage area. As a result, a smaller frequency reuse factor can be used for the inner communication coverage area, giving more capacity to the overall system.

For example, when the available spectrum is 4.41 MHz, a total of 147 30 kHz carrier channels are available for use. For a regular 3 sector cell configuration and a frequency reuse of 7, the calculates Erlang capacity of the cell is 39.6. This capacity can be exceeded by using the hybrid inner/outer sectored cell approach. As and example two different inner communication coverage area configurations will be considered, an omni and a three sector configuration. The omni configuration has the advantage of pooling the TDMA channels among all the channels in the inner communication coverage area while the three sector configuration enjoys less interference due to sectoring and hence can use a lower frequency reuse factor. In the former case (omni) a reuse of 4 is used and in the latter case (three sector) a reuse of 3 is used as an example throughout this document.

To take advantage of the hybrid inner/outer sectored cell technique, many possible configurations are available to partition the total number of carrier channels. Table 1 shows a number of possible configurations. As shown in Table 2, the number of available carriers for the inner and outer communication coverage areas vary depending on the number of carriers selected for the inner and outer communication coverage areas in Table 1. Similarly, the total Erlang capacity shown in Table 3 and Table 4 varies based on the number of time slots available for the inner and outer communication coverage areas. It is assumed that one time slot is used for DCCH on each logical antenna face).

TABLE 1

Total Number of 30 kHz Carriers Available for 4.41 MHz

| (Freq. Reuse) | Configuration A | Configuration B | Configuration C |
|---|---|---|---|
| Inner (K = 4) | 84 Carriers | 63 Carriers | 42 Carriers |
| Outer (K = 7) | 63 Carriers | 84 Carriers | 105 Carriers |
| Total Channels | 147 Carriers | 147 Carriers | 147 Carriers |

TABLE 2

Number of 30 kHz Carriers Available per Base Station

| (Freq. Reuse) | Configuration A | Configuration B | Configuration C |
|---|---|---|---|
| Inner-Omni (K = 4) | 21 Carriers | 15.75 Carriers | 10.5 Carriers |
| Inner-Three Sector (K = 3) | 28 Carriers | 21 Carriers | 14 Carriers |
| Outer-Three Sector (K = 7) | 3 Carriers/Sector | 4 Carriers/Sector | 5 Carriers/Sector |

TABLE 3

Number of Traffic Time Slots & Capacity
(Omni Inner communication coverage area)

| | Configuration A | | Configuration B | | Configuration C | |
|---|---|---|---|---|---|---|
| (Freq. Reuse) | Traffic Time Slots | Erlang Capacity | Traffic Time Slots | Erlang Capacity | Traffic Time slots | Erlang Capacity |
| Inner - Omni (K = 4) | 62 | 53 | 46 | 37 | 30 | 22 |
| Outer - Three Sector (K = 7) | 8 | <u>11</u> | 11 | <u>18</u> | 14 | <u>25</u> |
| Total Erlang Capacity | | 64 | | 55 | | 47 |

TABLE 4

Number of Traffic Time Slots & Capacity
(Three Sector Inner communication coverage area)

| | Configuration A | | Configuration B | | Configuration C | |
|---|---|---|---|---|---|---|
| (Freq. Reuse) | Traffic Time Slots | Erlang Capacity | Traffic Time Slots | Erlang Capacity | Traffic Time slots | Erlang Capacity |
| Inner - Three Sector (K = 3) | 27 | 58 | 20 | 40 | 13 | 22 |
| Outer - Three Sector (K = 7) | 8 | <u>11</u> | 11 | <u>18</u> | 14 | <u>25</u> |
| Total Erlang Capacity | | 69 | | 58 | | 47 |

For example, for configuration C, 105 carriers would be available to all the outer communication coverage areas, and 42 carriers would be available to the inner communication coverage areas. The inner communication coverage areas would be designed to be omnidirectional with a frequency reuse designed to be 4 (K=4) and have all 10 carries in ½ of the cell and all 11 carriers in the other ½ of the cells (42 carriers/4 frequency reuse) available on the inner communication coverage area. The outer communication coverage area would be designed for three sectors with the frequency reuse designed to be 7 (K=7) and have 5 carriers available per sector ((105 carriers/7 frequency reuse)/3 sectors).

With this particular design, total Erlang capacity at 2% blocking can be increased to 47 Erlangs compared to 39.6 Erlangs if a conventional 3 sector, K=7 configuration is used. 22 Erlangs are from the inner communication coverage area and 25 Erlangs are from the outer communication coverage area. For the inner communication coverage area, 30 time slots (10 carriers×3 time slots) are available, but only 29 time slots (30 minus 1 DCCH omnidirectional channel) are available for traffic. In the outer communication coverage area, 15 time slots (5 carriers×3 time slots) are available per sector, but only 14 time slots (15 minus 1 DCCH) are available for traffic.

Note that a trade-off exists between the uniformity of Erlang capacity distribution and total Erlang capacity. Configuration A provides a large Erlang capacity by putting most of the channels on the inner communication coverage area, while starving the outer communication coverage area's capacity. On the other hand, configuration C provides a more uniform Erlang capacity and the distribution is fairly equal on the inner and outer communication coverage areas with less total Erlang capacity.

To take full advantage of the hybrid inner/outer sectored cell systems, the EDRU using the Algebraic Coded Exiting Linear Prediction ACELP vocoder algorithm shall be utilized. From link budget analysis, the minimum requirement of a C/I of 17 dB 90% of the time can be met with a K=4 on the inner communication coverage area and K=7 on the outer communication coverage area with the use of the ACELP vocoder deployed in the areas where propagation attenuation slope is higher than 40 dB/decade ($\gamma$=4).

The outer communication coverage area is a K=7 three sector system which meets the minimum 17 dB C/I requirement. Analyzing the inner communication coverage area; a three sector K=7 reuse which meets the minimum C/I requirement of 17 dB is roughly equal to an omni system with K=12 reuse. Using Equation 1:

$$\text{Mean}\left\{\frac{C}{I}\right\}\bigg|_{on\ the\ cell\ boundary} = \frac{1}{6/m}\left(\frac{D}{R}\right)^\gamma = \frac{1}{6/m}\left(\sqrt{3K}\right)^\gamma \quad (1)$$

m=Number of sectors per cell
D=Frequency Reuse Distance Cells
R=Coverage Radius of Cell
$\gamma$=Propagation Path Loss Slope
K=Frequency Reuse Pattern
it can be seen that $\frac{1}{2}(\sqrt{3*7})^4|_{3\ sector} = \frac{1}{6}(\sqrt{3*12})^4|_{omni}$. Next considering an omni system with K=3 (i.e. D/R=$\sqrt{3K}$), and assuming the radius of the inner communication coverage area is ½ that of the omni system:

$$\left(\frac{D}{R/2}\right)\bigg|_{omni\ inner\ communications\ coverage\ area} = \left(\sqrt{3K'}\right) \quad (2)$$

where

K'=4K=12

That is, an omni inner communication coverage area with K=3 has the same C/I level as that of an omni cell with K'=12. Clearly, if an inner communication coverage area with K=3 meets the 17 dB C/I requirement, K=4 will meet that same requirement.

Table 5 shows a number of possible configurations for an available spectrum of 4.4 MHz, a total of 146 30 kHz carrier channels. As shown in Table 6, the number of available carriers for the inner and outer communication coverage areas vary depending on the number of carriers selected for the inner and outer communication coverage areas in Table 5. Similarly, the total Erlang capacity shown in Table 7 varies based on the number of time slots available for the inner and outer communication coverage areas. It is assumed that one time slot is used for DCCH on each logical antenna face).

TABLE 5

Total Number of 30 kHz Carriers Available for 4.4 MHz

| (Freq. Reuse) | Configuration A | Configuration B | Configuration C |
|---|---|---|---|
| Inner (K = 4) | 80 Carriers | 60 Carriers | 40 Carriers |
| Outer (K = 7) | 66 Carriers | 86 Carriers | 106 Carriers |
| Total Channels | 146 Carriers | 146 Carriers | 146 Carriers |

TABLE 6

Number of 30 kHz Carriers Available per Base Station

| (Freq. Reuse) | Configuration A | Configuration B | Configuration C |
|---|---|---|---|
| Inner-Omni (K = 4) | 20 Carriers | 15 Carriers | 10 Carriers |
| Outer-Three Sector (K = 7) | 3 Carriers/Sector | 4 Carriers/Sector | 5 Carriers/Sector |

TABLE 7

Number of Traffic Time Slots & Capacity (Erlang B - 2% Blocking)

| | Configuration A | | Configuration B | | Configuration C | |
|---|---|---|---|---|---|---|
| (Freq. Reuse) | Traffic Time Slots | Erlang Capacity | Traffic Time Slots | Erlang Capacity | Traffic Time slots | Erlang Capacity |
| Inner - Omni (K = 4) | 59 | 49 | 44 | 35 | 29 | 21 |
| Outer - Three Sector (K = 7) | 8 | 11 | 11 | 18 | 14 | 25 |
| Total Erlang Capacity | | 60 | | 53 | | 46 |

While the invention has been described with reference to a preferred embodiment, it will be understood by those skilled in the art having reference to the specification and drawings that various modifications may be made and various alternatives are possible therein without departing from the spirit and scope of the invention.

We claim:

1. A base station providing coverage to an inner communication coverage area and an outer communication coverage area, comprising:

a plurality of antenna elements, the plurality of antenna elements are operable to obtain an antenna pattern that covers the entire inner and the entire outer communication coverage areas;

a first antenna element of the plurality of antenna elements, the first antenna element having an antenna pattern that covers a first sector of the outer communication coverage area and at least a first portion of the inner communication coverage area, the first antenna element being operable to transmit a first signal directed to a first mobile terminal in the first sector of the outer communication coverage area;

a second antenna element of the plurality of antenna elements, the second antenna element having an antenna pattern that covers a second sector of the outer communication coverage area and at least a second portion of the inner communication coverage area, the second antenna element being operable to transmit a second signal directed to a second mobile terminal in the second sector of the outer communication coverage area;

responsive to the base station communicating with a mobile unit located in the inner communication coverage area, the plurality of antennas being operable to transmit using each of the plurality of antenna elements concurrently a third signal directed to a third mobile terminal in the inner communication coverage area;

wherein the furthest point of the inner communication coverage area from the first and second antennas is closer to the first and second antennas than the furthest point of the outer communication coverage area from the first and second antennas; and wherein the inner and outer communication coverage areas are in a hybrid inner/outer sectored cell.

2. The base station of claim 1, further comprising a third antenna element of the plurality of antenna elements, the third antenna element having an antenna pattern that covers a third sector of the outer communication coverage area and at least a third portion of the inner communication coverage area.

3. The base station of claim 2, wherein the first, second, and third portions of the inner communication coverage area comprise the entire inner communication coverage area.

4. The base station of claim 1, further comprising a signal combiner having:

a first input coupled to the first antenna element for receiving a first signal from the first antenna element;

a second input coupled to the second antenna element for receiving a second signal from the second antenna element; and an output that provides a signal formed from the first and second signals.

5. The base station of claim 4, wherein the signal combiner further includes a third input coupled to a third antenna element for receiving a third signal from the third antenna element; and the signal provided by the output comprises the third signal.

6. The base station of claim 1, further comprising a signal divider having a first output that provides at least a first part of a signal to the first antenna element and a second output that provides at least a second part of the signal to the second antenna element.

7. A method for providing coverage to an inner communication coverage area and an outer communication coverage area for use in system having a plurality of antenna elements operable to obtain an antenna pattern that covers the entire inner and the entire outer communication coverage areas, comprising the steps of:

transmitting a first signal directed to a first mobile terminal in a first sector in the outer communication coverage area using a first antenna element of the plurality of antenna elements;

transmitting a second signal directed to a second mobile terminal in a second sector in the outer communication coverage area using a second antenna element of the plurality of antenna elements;

responsive to the base station communicating with a mobile unit located in the inner communication coverage area transmitting a third signal directed to a first mobile terminal in the inner communication coverage area using each of the plurality of antenna elements concurrently;

wherein the furthest point of the inner communication coverage area from the first and second antennas is closer to the first and second antennas than the furthest point of the outer communication coverage area from the first and second antennas; and wherein the inner and outer communication coverage areas are in a hybrid inner/outer sectored cell.

8. The method of claim 7, further comprising the step of transmitting a fourth signal to a third sector in the outer communication coverage area using a third antenna element of the plurality of antenna elements and wherein the step of transmitting a third signal further comprises using the third antenna element.

9. The method of claim 7, wherein the first signal is transmitted at a first power level, the second signal is transmitted at a second power level and the third signal is transmitted at a third power level, the third power level being less than the smaller of: the first power level and the second power level.

* * * * *